(12) United States Patent
Dai

(10) Patent No.: US 10,840,952 B2
(45) Date of Patent: Nov. 17, 2020

(54) RF SWITCHING SYSTEM FOR 5G COMMUNICATIONS AND DESIGN METHOD THEREOF

(71) Applicant: Shanghai Huahong Grace Semiconductor Manufacturing Corporation, Shanghai (CN)

(72) Inventor: Ruofan Dai, Shanghai (CN)

(73) Assignee: Shanghai Huahong Grace Semiconductor Manufacturing Corporation, Shanghai (CN)

( * ) Notice: Subject to any disclaimer, the term of this patent is extended or adjusted under 35 U.S.C. 154(b) by 29 days.

(21) Appl. No.: 16/232,476

(22) Filed: Dec. 26, 2018

(65) Prior Publication Data

US 2020/0076452 A1    Mar. 5, 2020

(30) Foreign Application Priority Data

Aug. 31, 2018  (CN) ........................ 2018 1 1014916

(51) Int. Cl.
*H04B 1/00* (2006.01)
*H04W 88/06* (2009.01)

(52) U.S. Cl.
CPC ............. *H04B 1/006* (2013.01); *H04W 88/06* (2013.01)

(58) Field of Classification Search
CPC .............................. H04B 1/006; H04W 88/06
See application file for complete search history.

(56) References Cited

U.S. PATENT DOCUMENTS

| | | | | |
|---|---|---|---|---|
| 2011/0269416 | A1* | 11/2011 | Kadoi | H04B 1/0458 455/127.2 |
| 2017/0063404 | A1* | 3/2017 | Langer | H04W 72/0453 |
| 2018/0183483 | A1* | 6/2018 | Kogure | H04B 1/40 |
| 2018/0351528 | A1* | 12/2018 | Liu | H03B 5/1203 |
| 2018/0376338 | A1* | 12/2018 | Ashrafi | H04L 67/10 |
| 2020/0028357 | A1* | 1/2020 | Chen | H05K 1/0259 |

* cited by examiner

*Primary Examiner* — Lewis G West
(74) *Attorney, Agent, or Firm* — Murtha Cullina LLP

(57) ABSTRACT

A radio-frequency (RF) switching system for 5G communications and a method of designing it are disclosed. The RF switching system includes a MMMB switching unit and an antenna. The MMMB switching unit includes a 5G-mode multiband switching subunit including a 5G-mode low-frequency (LF)-band switching subunit and a 5G-mode high-frequency (HF)-band switching subunit partitioned from the 5G-mode LF-band switching subunit at a reference frequency. The 5G-mode LF-band switching subunit is connected to the antenna via a low-pass filter, and the 5G-mode HF-band switching subunit is connected to the antenna via a high-pass filter. The RF switching system for 5G communications has improved isolation performance in both the HF and LF bands and improved insertion loss performance in the HF band.

11 Claims, 6 Drawing Sheets

RF SWITCHING SYSTEM FOR 5G COMMUNICATIONS AND DESIGN METHOD THEREOF

CROSS-REFERENCE TO RELATED APPLICATION

This application claims the priority of Chinese patent application number 201811014916.7, filed on Aug. 31, 2018, the entire contents of which are incorporated herein by reference.

TECHNICAL FIELD

The present invention relates to the field of radio-frequency (RF) front-end integrated circuits (ICs) and, in particular, to an RF switching system for 5G communications and design methods thereof.

BACKGROUND

With the development of multimode multiband (MMMB) mobile communications, the complexity of RF antenna switches used in RF front-end IC designs is increasing. Such an RF antenna switch is required to have high power linearity, a high resonant rejection ratio, a low insertion loss (IL) and a high isolation, to the greatest extent. Among these performance parameters, insertion loss is known as a transmission loss resulting from a switch in its "on" state typically in the form of attenuation. And the insertion loss is expressed as a corresponding number of decibels (dB) of the signal level suffering from the loss. Isolation is defined as a proportion of the power of an input local oscillator (LO) or RF signal that leaks to another or other ports, i.e., the attenuation between the input and output ports of the switch. It is a metric of how effectively the switch is turned off and is also measured in dB. In the wireless transmission applications, a higher data transmission rate requires a broader spectrum bandwidth. According to the communication principles, the maximum signal bandwidth of a wireless communication application is about 5% of the carrier frequency used. Therefore, the higher the carrier frequency is, the wider the signal bandwidth will be. For this reason, 5G communications will involve the use of millimeter-wave bands and RF front-end components that can operate in these bands. 5G stands for the fifth generation of mobile communication standards, or the fifth generation of mobile communication technologies. The 5G mode are typically backward compatible with the 4G, 3G and 2G modes. Depending on countries or regions, each of these modes is assigned with a number of different frequency bands. For example, the 5G mode can be designated to use a low-frequency (LF) band below 10 GHz and a high-frequency (HF) band above 10 GHz. Reference is now made to FIG. 1, a conventional RF switching system includes a MMMB switching unit and an antenna connected to the MMMB switching unit. The MMMB switching unit typically has a so-called single pole multiple throw (SPMT) architecture. FIG. 2 is an equivalent circuit diagram of the RF switch of FIG. 1. An equivalent turn-off capacitance of the MMMB switching unit with respect to the ground increases with its number of throws and is therefore of a low-pass nature which may greatly degrade the insertion-loss performance of the RF switch in the HF band, especially in the millimeter-wave spectrum. Reference is made to FIG. 3, a diagram showing a simulated insertion-loss profile of the conventional RF switching system of FIG. 1 in the HF and LF bands for 5G communications above and below 10 GHz, respectively.

As illustrated, the insertion loss of the RF switch is −266.9 mdB at 1 GHz, −594.7 mdB at 6 GHz, −4.864 dB at 26 GHz, −8.379 dB at 39 GHz and −16.45 dB at 71 GHz. Though the degradation of the conventional RF switching system's insertion loss performance is insignificantly in the 5G LF band below 10 GHz, it accelerates rapidly with frequency in the 5G HF band. Such significantly degraded insertion loss performance of the RF switching system in the HF band above 10 GHz, i.e., significantly increased insertion loss between the Rx and Tx port thereof and the antenna, can deteriorate its transmission efficiency and receiving sensitivity in this band. Therefore, how to improve the insertion loss performance of conventional RF switching systems for 5G communications in the frequency band above 10 GHz remains an urgent issue to be addressed by those skilled in the art.

SUMMARY OF THE INVENTION

It is an object of the present invention to provide an RF switching system for 5G communications with unproved insertion loss performance in the HF band and improved isolation performance in both the HF and LF bands.

To this end, an RF switching system for 5G communications provided in the present invention includes a multimode multiband (MMMB) switching unit and an antenna, the MMMB switching unit including a 5G-mode multiband switching subunit, the 5G-mode multiband switching subunit including a 5G-mode low-frequency (LF)-band switching subunit and a 5G-mode high-frequency (HF)-band switching subunit partitioned from the 5G-mode LF-band switching subunit at a reference frequency, the 5G-mode LF-band switching subunit connected to the antenna via a low-pass filter, the 5G-mode HF-hand switching subunit connected to the antenna via a high-pass filter.

Additionally, in the RF switching system for 5G communications provided in the present invention, the reference frequency partitioning the 5G-mode multiband switching subunit into the 5G-mode LF-band switching subunit and the 5G-mode HF-band switching subunit may lie in a range from 7 GHz to 22 GHz.

Additionally, in the RF switching system for 5G communications provided in the present invention, the low-pass filter may be provided by an RLC resonant filter network comprised of an inductor connected in series between the 5G-mode LF-band switching subunit and the antenna and of a turn-on resistor and a turn-off capacitor in the 5G-mode LF-band switching subunit.

Additionally, in the RF switching system for 5G communications provided in the present invention, the MMMB switching unit may further include a 4G-mode multiband switching subunit, a 3G-mode multiband switching subunit and/or a 2G-mode multiband switching subunit, each of which is connected to the antenna via the low-pass filter.

Additionally, in the RF switching system for 5G communications provided in the present invention, the low-pass filter may be provided by an RLC resonant filter network comprised of an inductor connected in series between the antenna and a shared branch for any cot b nation of the 5G-mode LF-band switching subunit, the 4G-mode multiband switching subunit, the 3G-mode multiband switching subunit and the 2G-mode multiband switching subunit and of a turn-on resistor and a turn-off capacitor in said combination of the 5G-mode LF-band switching subunit, the 4G-mode multiband switching subunit, the 3G-mode multiband switching subunit and the 2G-mode multiband switching subunit.

Additionally, in the RF switching system for 5G communications provided in the present invention, the high-pass filter may be provided by an RC resonant filter network comprised of a capacitor connected in series between the 5G-mode HF-band switching subunit and the antenna and of a turn-on resistor and a turn-off capacitor in the 5G-mode HF-band switching subunit.

Additionally, in the RF switching system for 5G communications provided in the present invention, the MMMB switching unit may be a single-pole multi-throw (SPMT) switch or a double-pole multi-throw (DPMT) switch.

The above objective is also attained by a method of designing a RF switching system for 5G communications, in which a 5G-mode multiband switching subunit is partitioned into a 5G-mode low-frequency (LF)-band switching subunit and a 5G-mode high-frequency (HF)-band switching subunit at a reference frequency, the 5G-mode LF-band switching subunit connected to an antenna via a low-pass filter, the 5G-mode HF-band switching subunit connected to the antenna via a high-pass filter, thereby improving insertion loss performance of the RF switching system for 5G communications in a HF band and improving isolation performance of the RF switching system for 5G communications in both HF and LF bands through filtering and isolating capabilities provided by the low-pass filter and the high-pass filter.

Additionally, in the method provided in the present invention, the reference frequency partitioning the 5G-mode multiband switching subunit into the 5G-mode LF-band switching subunit and the 5G-mode HF-hand switching subunit may lie in a range from 7 GHz to 22 GHz.

Additionally, in the method provided in the present invention, a MMMB switching unit including the 5G-mode multiband switching subunit may be provided to be downward compatible with 4G 3G and/or 2G modes through further including a 4G-mode multiband switching subunit, a 3G-mode multiband switching subunit and/or a 2G-mode multiband switching subunit, wherein the low-pass filter is connected between the antenna and a shared branch for any combination of the 5G-mode LF-band switching subunit, the 4G-mode multiband switching subunit, the 3G-mode multiband switching subunit and the 2G-mode multiband switching subunit, when operating in a mode to be downward compatible with the 4G, 3G and/or 2G modes, the RF switching system for 5G communications has improved insertion loss performance in the HF band and improved isolation performance in the HF band and the LF band.

Additionally, in the method provided in the present invention, the low-pass filter may be provided by an RLC resonant filter network comprised of an inductor connected in series between the 5G-mode LF-band switching subunit and the antenna and of a turn-on resistor and a turn-off capacitor in the 5G-mode LF-band switching subunit.

Additionally, in the method provided in the present invention, the low-pass filter may be provided by an RLC resonant filter network comprised of an inductor connected in series between the antenna and the shared branch for the said combination of the 5G-mode LF-band switching subunit, the 4G-mode multiband switching subunit, the 3G-mode multiband switching subunit and the 2G-mode multiband switching subunit and of a turn-on resistor and a turn-off capacitor in the said combination of the 5G-mode LF-band switching subunit, the 4G-mode multiband switching subunit, the 3G-mode multiband switching subunit and the 2G-mode multiband switching subunit.

Additionally, in the method provided in the present invention, the high-pass filter may be provided by an RC resonant filter network comprised of a capacitor connected in series between the 5G-mode HF-band switching subunit and the antenna and of a turn-on resistor and a turn-off capacitor in the 5G-mode HF-band switching subunit.

As noted above, in the RF switching system for 5G communications and the method of design thereof provided in the present invention, the 5G-mode multiband switching subunit in the MMMB switching unit is partitioned into the 5G-mode LF-band switching subunit and the 5G-mode HF-band switching subunit at the reference frequency. In this way, during the transmission or reception of an RF signal at a frequency within the 5G-mode LF band, HF interference with the 5G-mode LF-band switching subunit can be prevented thanks to the filtering capabilities of the low-pass filter disposed between the 5G-mode LF-band switching subunit and the antenna so that the RF signal can pass therethrough only if it is in the 5G-mode LF band. This ensures that the RF signal in the 5G-mode LF bated will not experience any degradation due to insertion loss. On the other hand, stronger isolation between the 5G-mode LF and HF bands is achieved thanks to the isolation capabilities of the high-pass filter between the 5G-mode HF-band switching subunit and the antenna. During the transmission or reception of an RF signal at a frequency within the 5G-mode HF band, any LF interference with the MMMB switching unit can be eliminated by the high-pass filter. With the suppression by the HF rejection band of the low-pass filter, any degradation of the RF signal in the 5G-mode HF band by the turn-off capacitance in the switching branch for the 5G-mode LF band can be avoided, allowing the passage of the RF signal in the 5G-mode HF-band with reduced insertion loss. Additionally, the isolation capabilities of the low-pass filter further results in an increase in isolation in the 5G-mode HF band. The invention is particularly suitable for improving, in terms of insertion loss and isolation, RF signals in 5G-mode millimeter-wave frequency bands.

In the figures: 100—RF switching system; 110—MMMB switching unit; 111—5G-mode multiband switching subunit; 1111—5G-mode LF-band switching subunit; 1112—5G-mode HF-band switching subunit; 112—4G-mode multiband switching subunit; 113—3G-mode multiband switching subunit; 114—2G-mode multiband switching subunit; 120—antenna; 130—low-pass filter; 140—high-pass filter.

DETAILED DESCRIPTION

The present invention will be described in greater detail below with reference to a few specific embodiments which are to be read in connection with the accompanying drawings. Note that these figures are provided in a very simplified form and not necessarily drawn to scale, with the only purpose to facilitate convenience and clarity in explaining the several embodiments.

Figure 1:
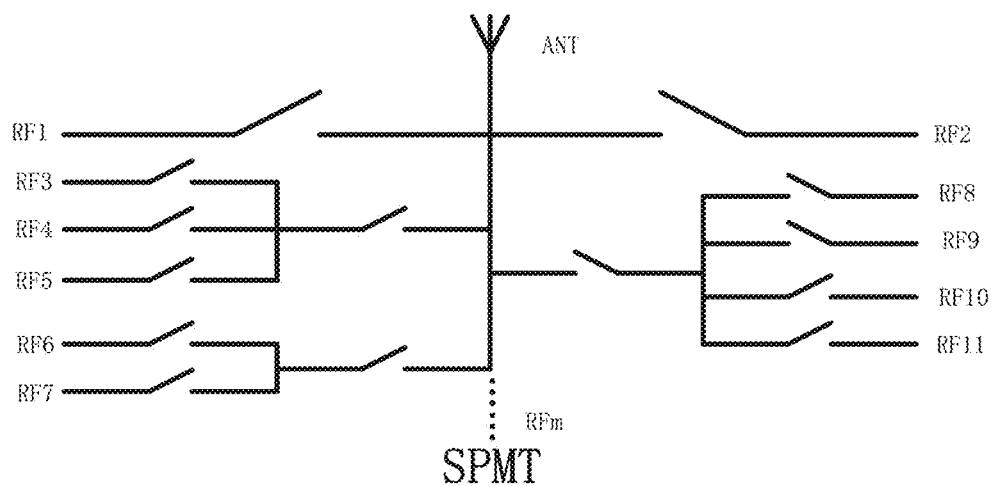
FIG. 1 is a structural schematic of a conventional RF switch.
Figure 2:
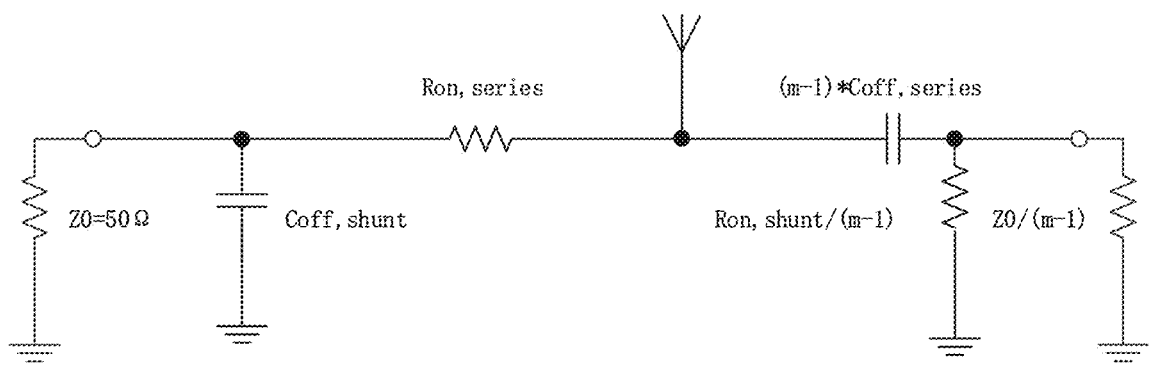
FIG. 2 is an equivalent circuit diagram of the RF switch of FIG. 1.
Figure 3:
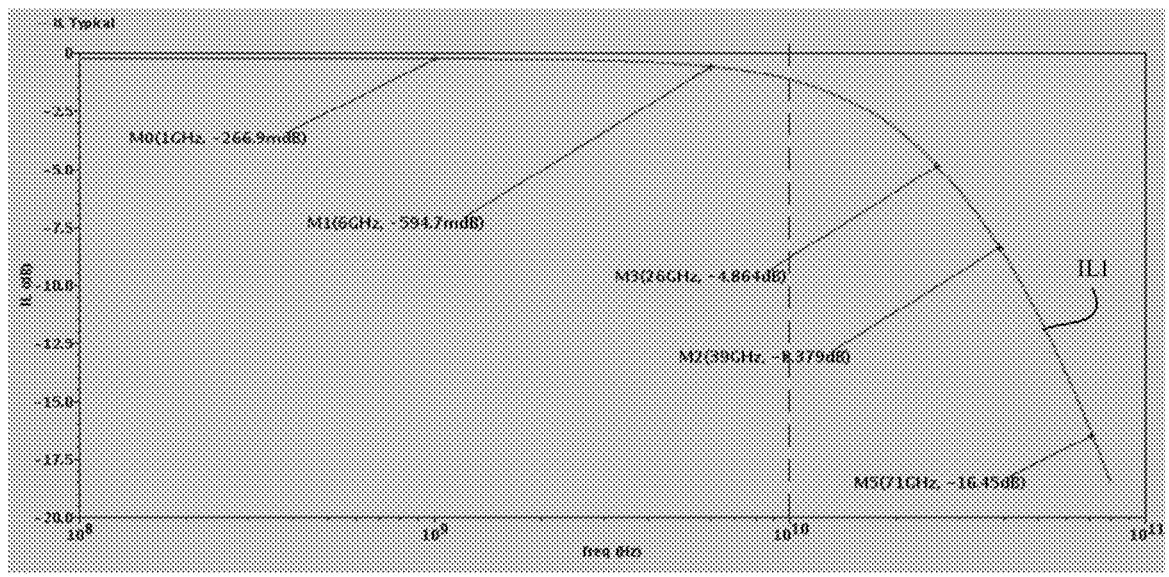
FIG. 3 is a simulated insertion-loss profile of the conventional RF switch.
Figure 4:
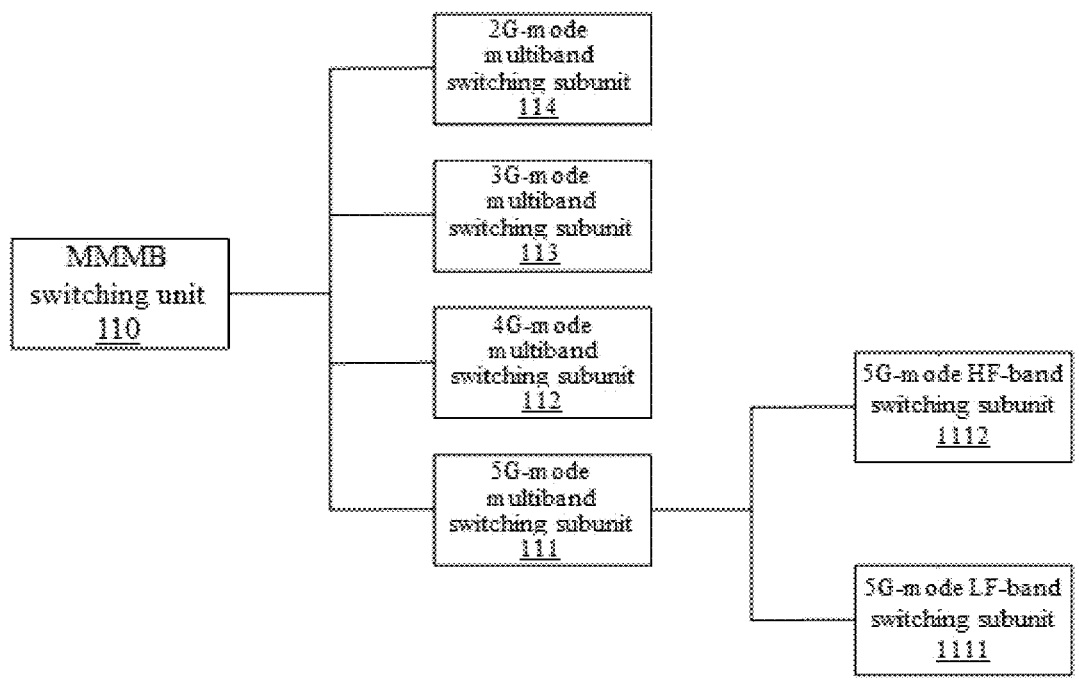
FIG. 4 is a structural schematic of an MMMB switching unit according to an embodiment of the present invention.
Figure 5:
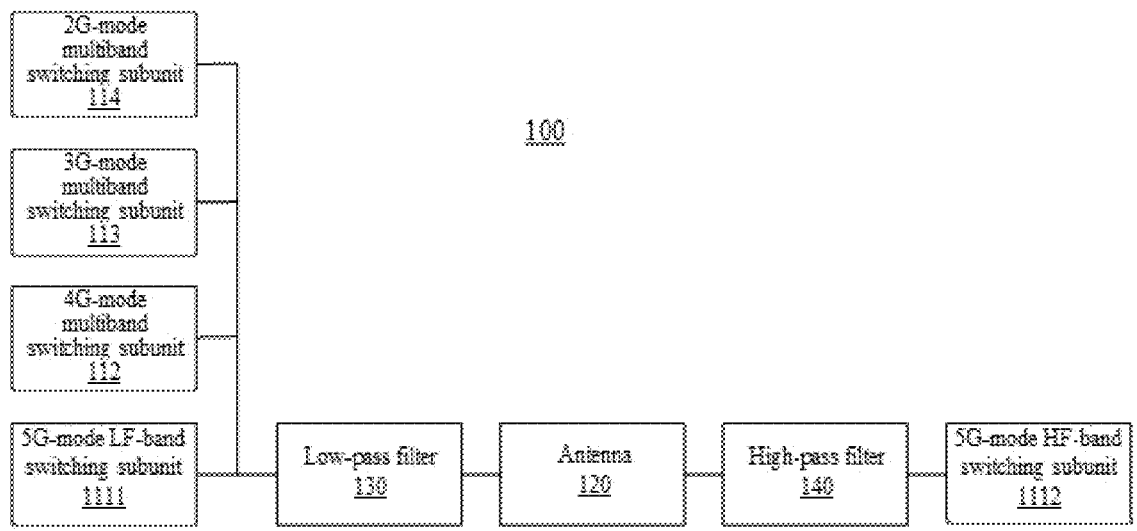
FIG. 5 is a block diagram of an RF switching system for 5G communications according to an embodiment of the present invention.
Figure 6:
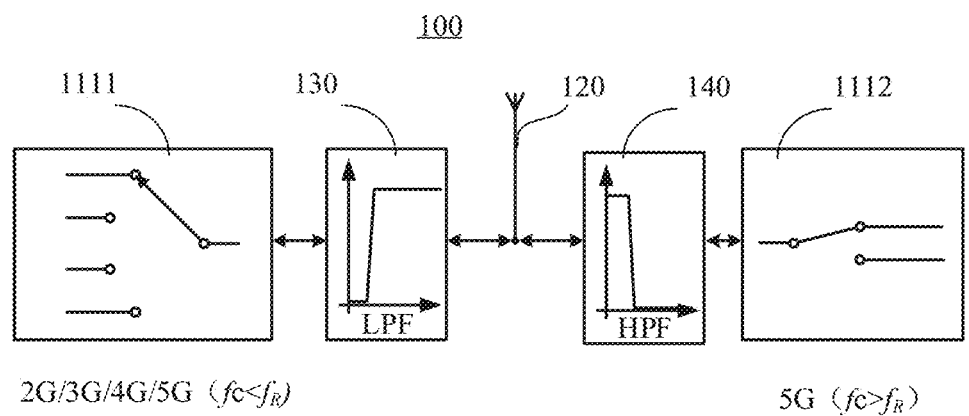
FIG. 6 is a structural schematic of an RF switching system for 5G communications according to an embodiment of the present invention.

Referring to FIGS. 4 to 6, a radio-frequency switching system 100 for 5G communications according to an embodiment of the present invention includes a multimode multiband (MMMB) switching unit 110 and an antenna 120. The MMMB switching 110 includes a 5G-mode multiband switching subunit 111 including a 5G-mode low-frequency (LF)-band switching subunit 1111 and a 5G-mode high-frequency (HF)-band switching subunit 1112 partitioned from the 5G-mode LF-band switching subunit 1111 at a reference frequency $f_R$. A low-pass filter 130 is connected between the 5G-mode LF-band switching subunit 1111 and the antenna 120. A high-pass filter 140 is connected between the 5G-mode HF-band switching subunit 1112 and the antenna 120. The reference frequency $f_R$ may be selected as, but is not limited to, a frequency lying between 7 GHz and 22 GHz. The 5G-mode HF-band switching subunit 1112 is configured for transmission or reception of a signal at a frequency $fc > f_R$, i.e., within the 5G-mode HF band, while the 5G-mode LF-band switching subunit 1111 is configured for transmission or reception of a signal at a frequency $fc < f_R$, i.e., within the 5G-mode LF band. In embodiments of the present invention, the reference frequency is preferred to be 10 GHz corresponding to a centimeter band. Several wavelengths of RF signals and the corresponding frequency bands are summarized in Table 1.

TABLE 1

| Wavelength | Frequency Band |
| --- | --- |
| 0.01 m-0.1 m (centimeter waves) | 3 GHz-30 GHz |
| 0.001 m-0.01 m (millimeter waves) | 30 GHz-300 GHz |

According to the 5G communication standards, the 5G mode is globally assigned with an LF band and an HF band, as presented in Table 2.

TABLE 2

| Type | Frequency Band |
| --- | --- |
| LF band (FR1) | 450 MHz-6.0 GHz |
| HF band (FR2) | 24.0 GHz-71.0 GHz |

In the RF switching system 100 for 5G communications of the present invention, the 5G-mode multiband switching subunit in the MMMB switching unit 110 is partitioned into the 5G-mode LF-band switching subunit 1111 and the 5G-mode HF-band switching subunit 1112 at the reference frequency $f_R$. In this way, during the transmission or reception of an RF signal at a frequency within the 5G-mode LF band, HF interference with the 5G-mode LF-band switching subunit can be prevented thanks to the filtering capabilities of the low-pass filter disposed between the 5G-mode LF-band switching subunit and the antenna so that the RF signal can pass therethrough only if it is in the 5G-mode LF band. This ensures that the RF signal in the 5G-mode LF band will not experience any degradation due to insertion loss. On the other hand, stronger isolation between the 5G-mode LF and HF bands is achieved thanks to the isolation capabilities of the high-pass filter between the 5G-mode I-IF-band switching subunit and the antenna. During the transmission or reception of an RF signal at a frequency within the 5G-mode band, any LF interference with the MMMB switching unit can be eliminated by the high-pass filter. With the suppression by the HF rejection band of the low-pass filter, any degradation of the RF signal in the 5G-mode HF band by the turn-off capacitance in the switching branch for the 5G-mode LF band can be avoided, allowing the passage of the RF signal in the 5G-mode HF-band with reduced insertion loss. Additionally, the isolation capabilities of the low-pass filter further results in an increase in isolation between the 5G-mode LF and HF bands. The invention is particularly suitable for improving, in terms of insertion loss and isolation, RF signals in 5G-mode millimeter-wave frequency bands.

Figure 7:
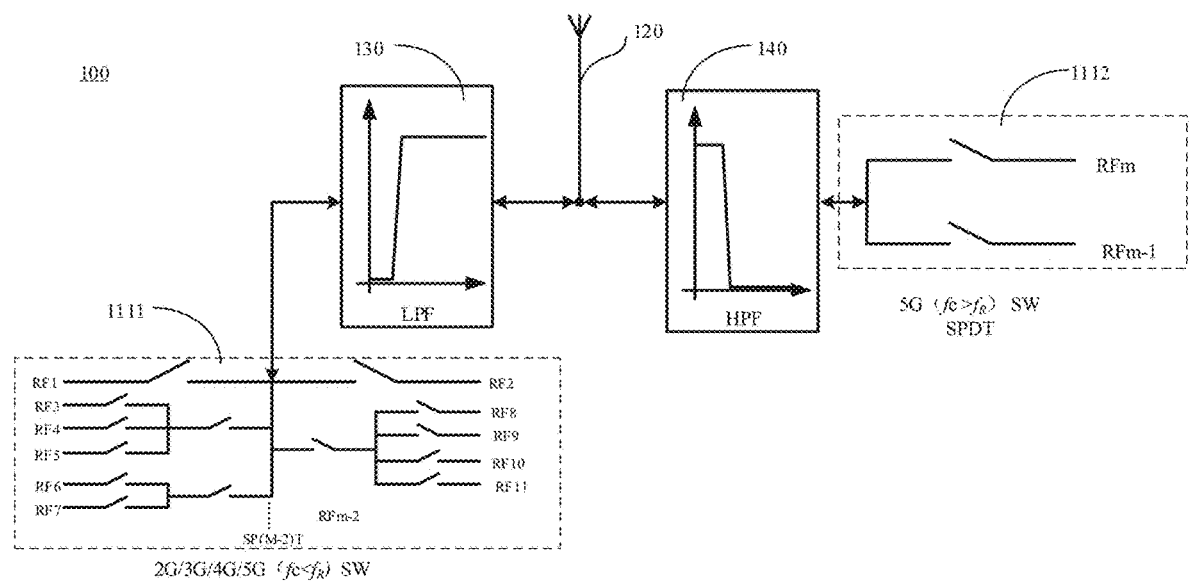
FIG. 7 is a structural schematic of an MMMB switch of an SPMT type and an RF switching system for 5G communications according to an embodiment of the present invention.

In an embodiment, the MMMB switching unit 110 of the RF switching system 100 for 5G communications of the present invention may be a single-pole multi-throw (SPMT) switch or a double-pole multi-throw (DPMT) switch. Referring to FIG. 7, in order for improved isolation to be achieved, according to an embodiment of the present invention, the SPMT switch is architecturally designed with a shared switching branch involving either the 5G-mode LF-band switching subunit 1111 or the 5G-mode HF-band switching subunit 1112. In the illustrated embodiment, since the 5G-mode HF-band switching subunit 1112 is double-routed, the former case corresponds to an SP(M-2)T switch, while the latter case corresponds to a single-pole double-throw (SPDT) switch. In FIG. 7, RF1, RF2 . . . RFm-2, RFm-1 and RFm each indicate an RF port capable of both transmission and reception.

Referring to FIGS. 4, 5 and 7, according to an embodiment of the present invention, the MMMB switching unit 110 of the RF switching system 100 for 5G communications further includes a 4G-mode multiband switching subunit 112, a 3G-mode multiband switching subunit 113 and/or a 2G-mode multiband switching subunit 114. Each of the 4G-mode multiband switching subunit 112, the 3G-mode multiband switching subunit 113 and/or the 2G-mode multiband switching subunit 114 is connected to the antenna 120 via the low-pass filter 130. In other words, according to this embodiment of the present invention, the RF switching system 100 for 5G communications is downward compatible to the 4G, 3G and 2G modes. In case of unstable connection or disconnection of the 5G communication link, a switch may be made to the 4G, 3G or 2G mode.

Figure 8:
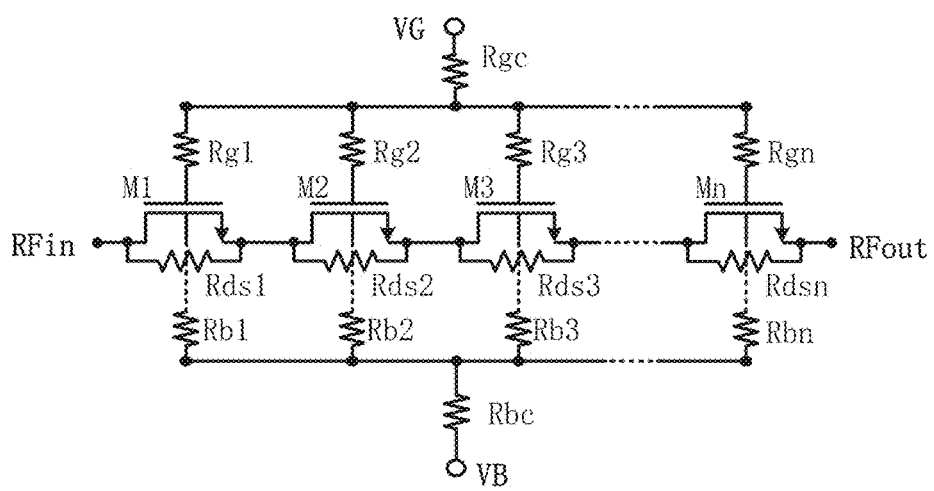
FIG. 8 is a circuit schematic diagram of one of RF switching branches in an MMMB switching unit according to an embodiment of the present invention.

Referring to FIG. 8, according to an embodiment of the present invention, a switching branch (i.e., an RF port) in the MMMB switching unit includes a gate voltage control module, a switching module and a body control module. Each of the gate voltage control module and the body control module is composed of a common bias resistor. The switching module is comprised of a plurality of cascaded NMOS transistors M1, M2, . . . , Mn, a plurality of body bias resistors Rbn, a plurality of gate bias resistors Rgn and a plurality of via resistors Rdsn. The common bias resistors Rgc, Rbc are connected respectively between the switching module and a gate control voltage VG and between the switching module and a body control voltage VB. In this figure, RFin indicates an RF signal input and RFout denotes an RF signal output. The switching components adopted in the switching; branch are not limited to the NMOS transistors, because they can also be implemented as PMOS transistors.

According to an embodiment of the present invention, the MMMB switching unit 110 is designed with individual branches each comprised of cascaded RF switches and with impedance matching. The impedance matching is provided both at the ports near the antenna and at the RF ports and may be accomplished in any manner as long as broadband matching with low insertion loss is obtained.

In a preferred embodiment of the present invention, each of the low-pass filter 130 and the high-pass filter 140 may be a filter circuit of any particular type known in the art.

Figure 9:
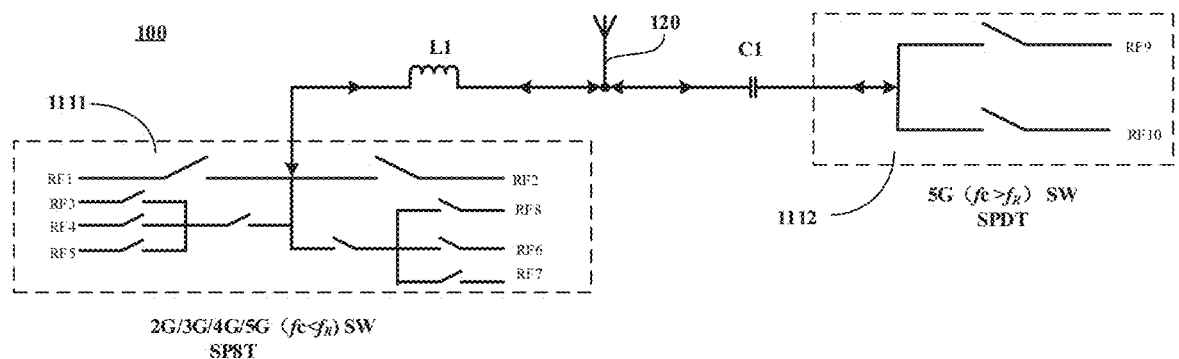
FIG. 9 is a circuit schematic diagram of an RF switching system for 5G communications of a SP10T type according to an embodiment of the present invention.
Figure 10A:
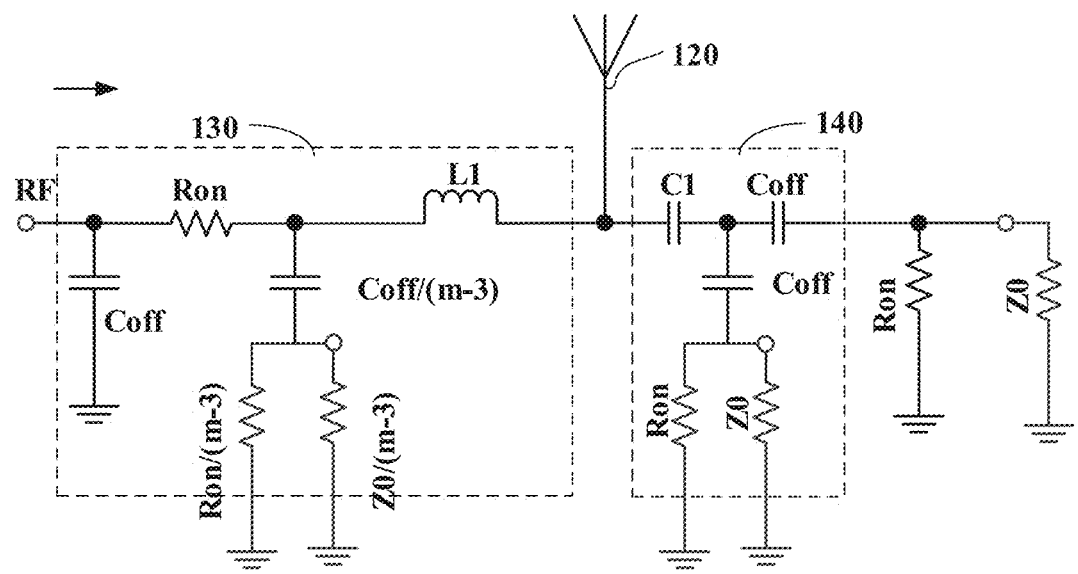
FIG. 10A is a schematic equivalent circuit diagram of a 5G RF switch of an SPMT type operating in an LF band according to an embodiment of the present invention.
Figure 10B:
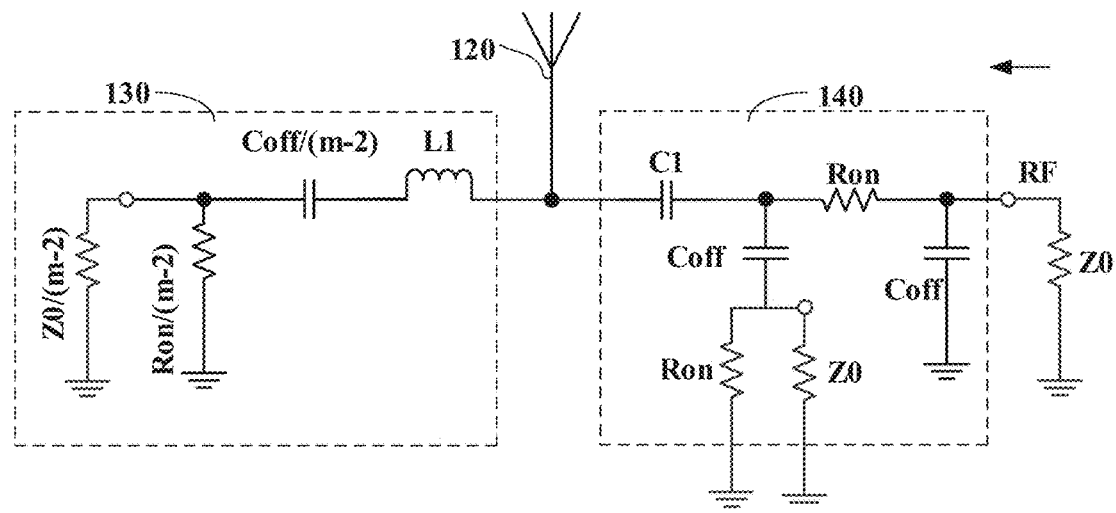
FIG. 10B is a schematic equivalent circuit diagram of a 5G RF switch of an SPMT type operating in an HF band according to an embodiment of the present invention.

According to an embodiment of the present invention, in order for circuit optimization to be achieved, referring to FIGS. 9, 10A and 10B, the low-pass filter 130 is provided by an RLC resonant filter network. Wherein the RLC resonant filter network is comprised of an inductor L1 connected in series between the 5G-mode LF-hand switching subunit 1111 and the antenna 120 and of a turn-on resistor and a turn-off capacitor both in the 5G-mode LF-band switching subunit 1111. The RLC resonant filter network may include, in a certain switching branch of the 5G-mode LF-band switching subunit 1111, an impedance matching component, a turn-on capacitor and a turn-off capacitor at its RF port, as well as other loads. Referring to FIG. 10B, according to an embodiment of the present invention, the RLC resonant filter network includes the inductor L1 as well as a turn-off capacitor Coff (m-2), a turn-on resistor Ron (m-2) and an impedance matching component Z0 (m-2) in a switching branch. Referring to FIG. 10A, according to an embodiment of the present invention, the RLC resonant filter network includes the inductor L1, a turn-off capacitor Coff (m-3), a turn-on resistor Ron (m-3) and an impedance matching component Z0 (m-3) in a switching branch, as well as a turn-on resistor Ron and a turn-off capacitor Coff at an RF port thereof.

Referring again to FIGS. 9, 10A and 10B, according to an embodiment of the present invention, in case of the RF switching system 100 for 5G communications downward compatible with the 4G, 3G and/or 2G modes, the low-pass filter 130 is provided by an RLC resonant filter network. Wherein the RLC resonant filter network is comprised of an inductor L1 connected in series between the antenna 120 and a shared branch for an arbitrary combination of the 5G-mode LF-band switching subunit 1111 with the 4G-mode multiband switching subunit 112, the 3G-mode multiband switching subunit 113 and the 2G-mode multiband switching subunit 114 and of a turn-on resistor and a turn-off capacitor both in the arbitrary combination of the 5G-mode LF-band switching subunit 1111 with the 4G-mode multiband switching subunit 112, the 3G-mode multiband switching subunit 113 and the 2G-mode multiband switching subunit 114. According to such embodiments of the present invention, the low-pass filter 130 provided by the RLC resonant filter network comprised of the turn-on resistor and turn-off capacitor in the RF switch as well as of the inductor L1 allows circuit simplification by dispensing with the need to employ separate capacitors, resistors or other components. Further, the number of the inductor L1 is not limited to one, and a plurality of inductors L1 connected in series or in parallel may also be used.

According to an embodiment of the present invention, in order for circuit optimization to be achieved, referring to FIGS. 9, 10A and 10B, the high-pass filter 140 is provided by an RC resonant filter network. Wherein the RLC resonant filter network is comprised of a capacitor C1 connected in series between the 5G-mode HF-band switching subunit 1112 and the antenna 120 and of a turn-on resistor and a turn-off capacitor both in the 5G-mode HF-band switching subunit 1112. In the embodiment shown in FIG. 10B, the RC resonant filter network may include the capacitor C1, a turn-off capacitor Coff and a turn-on resistor Ron both in a certain switching branch in the 5G-mode HF-band switching subunit 1112, and optionally an impedance matching component Z0 also in the switching branch. Referring to FIG. 10A, the RC resonant filter network may include the capacitor C1 as well as a turn-off capacitor Coff, a turn-on resistor Ron and an impedance matching component Z0 in a certain switching branch in the 5G-mode HF-band switching subunit 1112. Alternatively, it may further include a turn-off capacitor Coff in a deactivated switching branch. In this case, the turn-off capacitor Coff in the deactivated switching branch may serve as a load. According to such embodiments of the present invention, the high-pass filter 140 only introduces the capacitor C1 between the antenna 120 and the 5G-mode HF-hand switching subunit 1112. This dispenses with the need to employ separate capacitors or other components, allowing simplification of the filter circuit. As a result of such a global design consideration, overall optimization of the 5G RF switch is obtained.

According to an embodiment of the present invention, the impedance matching may be at 50Ω.

FIG. 10A is a schematic equivalent circuit diagram of the 5G RF switch operating in the LF band according to an embodiment of the present invention. As shown in FIG. 10A, in its operation, for example, when an RF signal is transmitted from the RF port RF at a frequency fc=1 GHz in the 5G-mode LF band, it passes through the 5G-mode LF-band switching subunit 1111 and is filtered by the low-pass filter 130 before it reaches the antenna 120. In this process, the high-pass filter 140 rejects the passage of the 1-GHz RF signal, thereby increasing the isolation between the antenna 120 and the 5G-mode HF-band switching subunit 1112 and avoiding interference from the RF signal. The process to receive RF signal at 1 GHz from the antenna 120 is similar but proceeds in a reverse order. That is, the RF signal propagates from the antenna 120 to the 5G-mode LF-band switching subunit 1111 via the low-pass filter 130. In case of the 5G RF switch downward compatible to the 4G, 3G and/or 2G modes, the signal transmission and reception is carried out also in a similar way as the 1-GHz RF signals are transmitted and received.

FIG. 10B is a schematic equivalent circuit diagram of the 5G RF switch operating in the HF band according to an embodiment of the present invention. As shown in FIG. 10B, in its operation, for example, when an RF signal is sent out from the RF port RF at a frequency fc=39 GHz in the 5G-mode HF-band, it follows a switching branch in the 5G-mode HF-band switching subunit 1112 and is filtered by the high-pass filter 140 before it reaches the antenna 120. In this process, the low-pass filter 130 rejects the passage of the 39-GHz RF signal, thereby increasing the isolation between the antenna 120 and the 5G-mode LF-hand switching subunit 1111 and avoiding interference from the RF signal. The process to receive an RF signal at 39 GHz from the antenna 120 is similar but proceeds in a reverse order. That is, the RF signal propagates from the antenna 120 to the 5G-mode HF-band switching subunit 1112 via the high-pass filter 140.

In embodiments of the present invention, there is also provided a method for designing the RF switching system 100 for 5G communications, in which the 5G-mode multi-band switching subunit is partitioned into a 5G-mode LF-hand switching subunit 1111 and a 5G-mode HF-band switching subunit 1112 at the reference frequency $f_R$. The 5-mode LF-band switching subunit 1111 is connected to the antenna 120 via the low-pass filter 130, and the 5G-mode HF-band switching subunit 1112 is connected to the antenna 120 via the high-pass filter 140. As such, improvements in insertion loss performance of the RF switching system for 5G communications in the HF band and in isolation performance thereof in both the HF and LF bands result from the filtering and isolating capabilities of the low-pass filter 130 and high-pass filter 140.

In a preferred embodiment of the present invention, in the above method, the reference frequency partitioning the 5G-mode multiband switching subunit 111 into the 5G-mode LF-band switching subunit 1111 and the 5G-mode HF-band switching subunit 1112 lies between 7 GHz to 22 GHz. However, the reference frequency $f_R$ is not limited to this frequency range.

In a preferred embodiment of the present invention, in the above method, the MMMB switching unit 110 including the 5G-mode multiband switching subunit 111 is designed to be downward compatible with 4G, 3G and/or 2G modes through further including the 4G-mode multiband switching subunit 112, the 3G-mode multiband switching subunit 113 and/or the 2G-mode multiband switching subunit 114. In addition, the low-pass filter 130 is connected between the antenna 120 and a shared branch for an arbitrary combination of the 5G-mode LF-band switching subunit 1111 with the 4G-mode multiband switching subunit 112, the 3G-mode multiband switching subunit 113 and the 2G-mode multiband switching subunit 114 so that the RF switching system for 5G communications, when operating in a downward-compatible mode, has improved insertion loss performance in the HF band and improved isolation performance both in the HF and LF bands.

In a preferred embodiment of the present invention, in the above method, the low-pass filter 130 is provided by an RLC resonant filter network comprised of an inductor L1 connected in series between the 5G-mode LF-band switching subunit 1111 and the antenna 120 and of a turn-on resistor and a turn-off capacitor both in the 5G-mode LF-band switching subunit 1111.

In a preferred embodiment of the present invention, in the above method, the low-pass filter 130 is provided by an RLC resonant filter network comprised of an inductor L1 connected in series between the antenna 120 and the shared branch for the arbitrary cot b nation of the 5G-mode LF-band switching subunit 1111 with the 4G-mode multiband switching subunit 112, the 3G-mode multiband switching subunit 113 and the 2G-mode multiband switching subunit 114 and of a turn-on resistor and a turn-off capacitor both in the arbitrary combination of the 5G-mode LF-band switching subunit 1111 with the 4G-mode multiband switching subunit 112, the 3G-mode multiband switching subunit 113 and the 2G-mode multiband switching subunit 114.

In a preferred embodiment of the present invention, in the above method, the high-pass filter 140 is provided by an RC resonant filter network comprised of a capacitor C1 connected in series between the 5G-mode HF-band switching subunit 1112 and the antenna 120 and of a turn-on resistor and a turn-off capacitor in the 5G-mode HF-band switching subunit 1112.

According to embodiments of the present invention, the above method has the same benefits as the RF switching system 100 for 5G communications as defined above. According to embodiments of the present invention, the properties of the inductor L1 to allow the passage of LF signals and block the passage of HF signals and the properties of the capacitor C1 to allow the passage of HF signals and block the passage of LF signals can serve as a basis for explaining the improved insertion loss performance in the 5G-mode HF band and improved isolation performance in the 5G and all the other modes of the RF switching system 100 for 5G communications and the method of design thereof.

Figure 11:
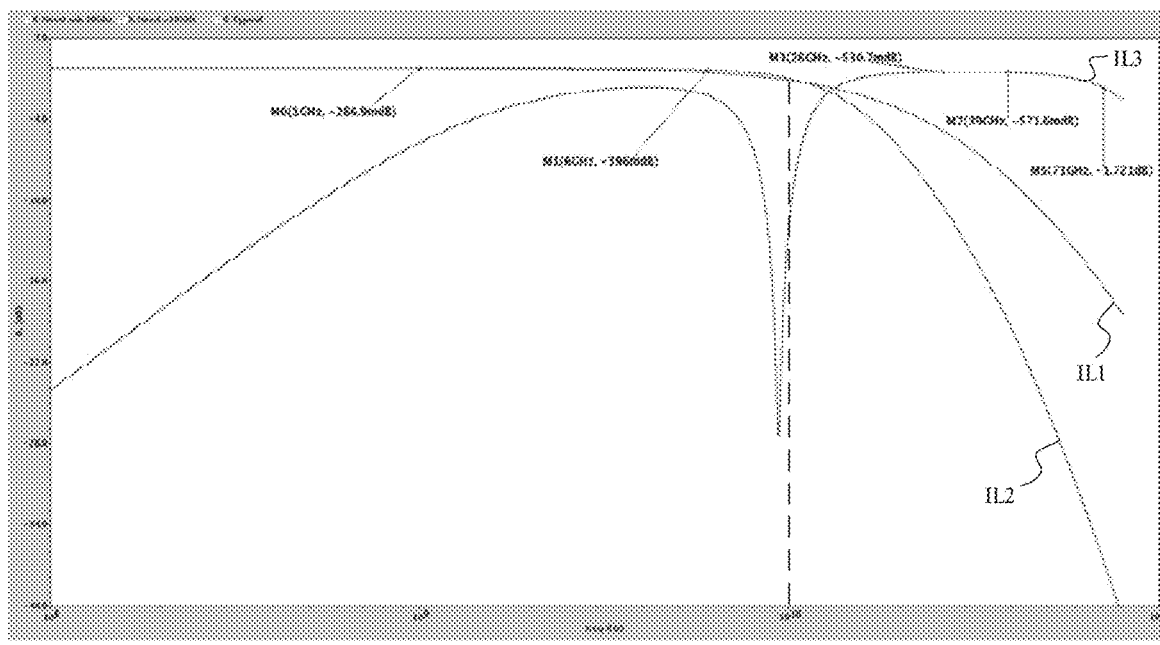
FIG. 11 is a simulated insertion-loss profile of a 5G RF switch according to an embodiment of the present invention.

Referring to FIG. 11, according to an embodiment of the present invention, the insertion loss performance of the RF switching system 100 for 5G communications is not or barely degraded in the other modes than 5G or in the 5G-mode LF band. According to the shown loss-profile IL2, insertion loss of the RF switching system 100 for 5G communications is −266.9 mdB at a frequency of 1 GHz, indicated at M0 (1 GHz, −266.9 mdB) and −396 mdB at a frequency of 6 GHz, indicated at M1 (6 GHz, −396 mdB). Therefore, according to this embodiment of the present invention, RF signals will not suffer from significant insertion loss in the 4G, 3G and 2G or in the sub-10 GHz 5G mode, and the RF switching system 100 for 5G communications has guaranteed LF-band communication quality. In the 5G-mode HF-band, the high-pass filter 140 filters out interference from the LF band, and under the action of the low-pass filter 130, the adverse effect of the turn-off capacitance in the LF band switching unit to the insertion loss performance is inhibited. As a result, as shown in the insertion-loss profile IL3, insertion loss of the RF switching system 100 for 5G communications is −530.7 mdB at a frequency of 26 GHz, indicated at M3 (26 GHz, −530.7 mdB), −571.6 mdB at a frequency of 39 GHz, indicated at M2 (39 GHz, −571.6 mdB) and −1.721 dB at a frequency of 71 GHz, indicated at M5 (71 GHz, −1.721 dB). Thus, according to this embodiment of the present invention, insertion loss performance of the RF switching system 100 for 5G communications in the 5G HF band is improved to below 1.75 dB, far lower than that of conventional RF switches in the range from 4.86 dB to 16.45 dB.

In the RF switching system for 5G communications and the method of design thereof according to the present invention, insertion loss between the MMMB switching unit 110 and the antenna 120 is reduced, resulting in improved transmission efficiency and receiving sensitivity of the RF switching system for 5G communications in the HF band.

While the invention has been described above with reference to several preferred embodiments, its scope is in no way limited to these embodiments. Any and all changes and modifications made by those of ordinary skill in the art based on the above teachings fall within the scope as defined in the appended claims.

What is claimed is:

1. A radio-frequency (RF) switching system for 5G communications, comprising a multimode multiband switching unit and an antenna, the multimode multiband switching unit comprising a 5G-mode multiband switching subunit, the 5G-mode multiband switching subunit comprising a 5G-mode low-frequency (LF)-band switching subunit and a 5G-mode high-frequency (HF)-band switching subunit partitioned from the 5G-mode LF-band switching subunit at a reference frequency, the 5G-mode LF-band switching subunit connected to the antenna via a low-pass filter, the 5G-mode HF-band switching subunit connected to the antenna via a high-pass filter,
wherein the low-pass filter is provided by an RLC resonant filter network comprised of an inductor connected in series between the 5G-mode LF-band switching subunit and the antenna and of a turn-on resistor and a turn-off capacitor in the 5G-mode LF-band switching subunit.

2. The RF switching system for 5G communications according to claim 1, wherein the multimode multiband switching unit further comprises a 4G-mode multiband switching subunit, a 3G-mode multiband switching subunit and/or a 2G-mode multiband switching subunit, each of which is connected to the antenna via the low-pass filter.

3. The RF switching system for 5G communications according to claim 2, wherein the low-pass filter is provided by an RLC resonant filter network comprised of an inductor connected in series between the antenna and a shared branch for any combination of the 5G-mode LF-band switching subunit, the 4G-mode multiband switching subunit, the 3G-mode multiband switching subunit and the 2G-mode multiband switching subunit and of a turn-on resistor and a turn-off capacitor in said combination of the 5G-mode LF-band switching subunit, the 4G-mode multiband switching subunit, the 3G-mode multiband switching subunit and the 2G-mode multiband switching subunit.

4. The RF switching system for 5G communications according to claim 1, wherein the high-pass filter is provided by an RC resonant filter network comprised of a capacitor connected in series between the 5G-mode HF-band switching subunit and the antenna and of a turn-on resistor and a turn-off capacitor in the 5G-mode HF-band switching subunit.

5. The RF switching system for 5G communications according to claim 1, wherein the multimode multiband switching unit is a single-pole multi-throw switch or a double-pole multi-throw switch.

6. A method of designing a radio-frequency (RF) switching system for 5G communications, comprising:
partitioning a 5G-mode multiband switching subunit into a 5G-mode low-frequency (LF)-band switching subunit and a 5G-mode high-frequency (HF)-band switching subunit at a reference frequency;
connecting the 5G-mode LF-band switching subunit to an antenna via a low-pass filter; and
connecting the 5G-mode HF-band switching subunit to the antenna via a high-pass filter, thereby improving insertion loss performance of the RF switching system for 5G communications in a HF band and improving isolation performance of the RF switching system for 5G communications in both HF and LF bands through filtering and isolating capabilities provided by the low-pass filter and the high-pass filter,
wherein the high-pass filter is provided by an RC resonant filter network comprised of a capacitor connected in series between the 5G-mode HF-band switching subunit and the antenna and of a turn-on resistor and a turn-off capacitor in the 5G-mode HF-band switching subunit.

7. The method according to claim 6, wherein a multimode multiband switching unit comprising the 5G-mode multiband switching subunit is provided to be downward compatible with 4G, 3G and/or 2G modes through further comprising a 4G-mode multiband switching subunit, a 3G-mode multiband switching subunit and/or a 2G-mode multiband switching subunit, and wherein the low-pass filter is connected between the antenna and a shared branch for any combination of the 5G-mode LF-band switching subunit, the 4G-mode multiband switching subunit, the 3G-mode multiband switching subunit and the 2G-mode multiband switching subunit, when operating in a mode to be downward compatible with the 4G, 3G and/or 2G modes, the RF switching system for 5G communications has improved insertion loss performance in the HF band and improved isolation performance in both HF and LF bands.

8. The method according to claim 6, wherein the low-pass filter is provided by an RLC resonant filter network comprised of an inductor connected in series between the 5G-mode LF-band switching subunit and the antenna and of a turn-on resistor and a turn-off capacitor in the 5G-mode LF-band switching subunit.

9. The method according to claim 7, wherein the low-pass filter is provided by an RLC resonant filter network comprised of an inductor connected in series between the antenna and the shared branch for the said combination of the 5G-mode LF-band switching subunit, the 4G-mode multiband switching subunit, the 3G-mode multiband switching subunit and the 2G-mode multiband switching subunit and of a turn-on resistor and a turn-off capacitor in the said combination of the 5G-mode LF-band switching subunit, the 4G-mode multiband switching subunit, the 3G-mode multiband switching subunit and the 2G-mode multiband switching subunit.

10. The RF switching system for 5G communications according to claim 1, wherein the reference frequency partitioning the 5G-mode multiband switching subunit into the 5G-mode LF-band switching subunit and the 5G-mode HF-band switching subunit lies in a range from 7 GHz to 22 GHz.

11. The method according to claim 6, wherein the reference frequency partitioning the 5G-mode multiband switching subunit into the 5G-mode LF-band switching subunit and the 5G-mode HF-band switching subunit lies in a range from 7 GHz to 22 GHz.

* * * * *